Oct. 29, 1929.   E. L. GREER ET AL   1,733,594
METHOD OF MANUFACTURING CENTERS
Filed April 13, 1928
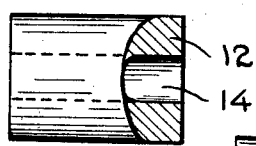
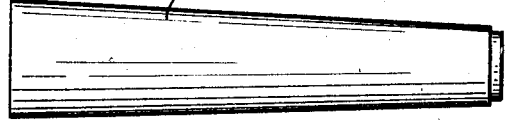
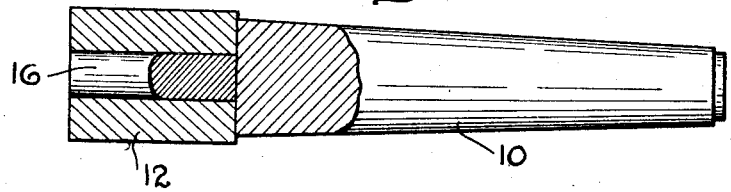
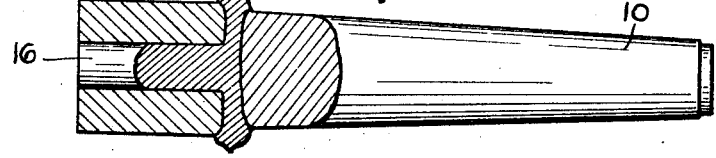
INVENTORS
Edward L. Greer and Thomas J. Brady
BY
Parker & Burton
ATTORNEYS Patented Oct. 29, 1929

1,733,594

UNITED STATES PATENT OFFICE

EDWARD L. GREER, OF DETROIT, AND THOMAS J. BRADY, OF PONTIAC, MICHIGAN

METHOD OF MANUFACTURING CENTERS

Application filed April 13, 1928. Serial No. 269,784.

Our invention relates to an improved method of manufacturing a center.

An object is to provide a novel method of manufacturing a center having an axial bearing portion possessing unusually high wear-resisting properties securely fixed in place against loosening or displacement and which axial bearing portion is structurally integral with the body of the center itself, and which is integrated with the body of the center at a point remote from its bearing end and substantially throughout the diameter of the center.

More specifically our invention relates to the improved method of manufacturing such a center which comprises the construction of a center from two sections, one being a shank section and the other being an axially cored out body section, securing an axial bearing portion possessing unusual hardness and wear-resisting properties within the cored out opening of the body section, and butt welding said section together forming a unitary structure and causing a portion of the material of the axial bearing portion to flow between and to integrate with the adjacent welded ends of said sections.

By following our improved process a center is produced having an axially disposed structurally integral bearing portion possessing unusual hardness and wear resisting properties.

Other advantages and meritorious features of our invention will more fully appear from the following description, appended claims and accompanying drawing, wherein:

Fig. 1 is a side elevation of the shank section of our center;

Fig. 2 is a side elevation of the body section partly broken away;

Fig. 3 is a side elevation of the hardened axial bearing insert;

Fig. 4 is a side elevation partly in section of the three sections assembled end to end and prior to the welding operation;

Fig. 5 is a view similar to Fig. 4 following the welding operation;

Fig. 6 is a view similar to Fig. 5 showing the center completely formed.

Our improved process relates to the manufacture of centers having at one end a tapered shank portion adapted to be received within a socket and having at the other end a bevelled bearing portion adapted, as in the case of a lathe center or other machinery employing centers, to support a piece of work which, during the operation of the machine provided with a center, serves to wear the supporting end of the center away necessitating a grinding and truing operation, and an object sought in centers of this type is to provide one which will wear for a considerable period of time.

Centers have heretofore been built having axially disposed hardened inserts secured in one way or another in the bearing end and my invention resides in an improved method of accomplishing the securing of such an insert in place.

In the drawing, let 10 indicate a tapered shank member adapted to be received within a suitable socket and 12 a body section axially cored out at 14 adapted to be secured to the end of the shank member. 16 is an insert receivable within the cored out opening 14 in the body section and it is formed of material possessing unusual hardness and wear-resisting properties. Such material is highly compacted and substantially nonporous and we have found certain alloy steels, such as what is known in the trade as diamond alloy, to be highly satisfactory for this purpose. Obviously other alloy steels possessing the required physical characteristics would be suitable and the one mentioned is merely illustrative.

The body is heated and the insert 16 disposed therein and the body section is then shrunk about said insert. It will be seen that the insert terminates substantially even with the end of the body section and that such body section and insert have uniform diameters and the diameter of the body action is here shown as greater than that of the large end of the shank section. The body section is then welded to the large end of the shank section and this may be accomplished by electrically welding the two together disposing an electrode of the welding apparatus in proximity to an end of each section to be welded.

The metal of which the shank and body sections is formed is substantially softer and more porous than that of which the insert is formed. The resistance of the insert is very materially higher than that of the shank and body sections. During the electric welding operation, therefore, the material of the insert flows outwardly or it might be said is blown outwardly between the adjacent ends of the shank and body section. Pressure, of course, is exerted, tending to force the sections together and as a result the three sections are welded forming a structurally integral member and the material of the insert fuses with and between the adjacent welded ends of the body and shank sections so that the insert is securely fixed in place. The excess material indicated by the dotted line in Fig. 6 is then removed and the center shaped to the form desired.

What we claim is:

1. That method of manufacturing a center comprising the steps of shrinking a body section about an axially disposed insert of substantially harder and more highly compacted wear-resisting material, butt welding said body section to one end of a shank section formed of material substantially less hard than the insert so that a portion of the material of which the insert is formed flows out between the adjacent ends of the shank and body sections forming an integral joint therebetween.

2. That method of securing an insert within a center comprising forming the center in two sections within one of which the insert is axially positioned and butt welding said sections together so that a portion of the material of which the insert is formed is integrated with and between the adjacent ends of the two sections.

3. That method of securing an axial insert within a center comprising providing a center in two sections consisting of a tapered shank section and a separate axially cored out uniform diameter body section, positioning an insert within said body section terminating at one end thereof, butt welding said end of the body section to an end of the shank section and integrating a portion of the insert between and with the adjacent ends of the shank and body sections.

4. That method of forming a center having a tapered shank section at one end and a tapered bearing at the opposite end provided with an axial portion of substantially greater hardness and wear-resisting properties than the portion surrounding the same comprising forming the center body in two sections, one section being a tapered shank section and the other section being an axially cored out body section having a uniform diameter greater than the diameter of the large end of the shank section, positioning an insert of substantially greater hardness and wear-resisting properties within the axial opening of the body section, butt welding said body section carrying the insert to the large end of the tapered shank section so that some of the material of the insert is caused to pass between and to integrate with the adjacent ends of the shank and body sections forming an integral structure and removing the excess of material at the joint and from the body section to form the center.

5. That method of forming a center comprising providing a tapered shank section, an axially cored out cylindrical body section, an insert adapted to be received within the passageway through the body section and possessing substantially greater hardness and wear-resisting properties, positioning said insert within the body section and electric welding one end of the body section carrying the insert to one end of the shank section to form an integral center and to cause material from the insert to integrate with and between the adjacent welded ends of the shank and body sections.

6. That method of manufacturing a center comprising securing within a cylindrical body section of uniform diameter an axial insert extending entirely therethrough and possessing substantially greater hardness and wear-resisting properties, and electrically butt welding one end of said body section to an end of a shank section to form an integral structure therewith.

In testimony whereof, we, EDWARD L. GREER and THOMAS J. BRADY, sign this specification.

EDWARD L. GREER.
THOMAS J. BRADY.